US005536309A

United States Patent [19]

Etzrodt et al.

[11] Patent Number: 5,536,309

[45] Date of Patent: Jul. 16, 1996

[54] BISMUTH VANADATE PIGMENTS

[75] Inventors: Guenter Etzrodt, Stuttgart; Helmut Knittel, Ludwigsburg; Hansulrich Reisacher, Sachsenheim, all of Germany

[73] Assignee: BASF Lacke & Farben Aktiengesellschaft, Muenster, Germany

[21] Appl. No.: 294,791

[22] Filed: Aug. 24, 1994

[30] Foreign Application Priority Data

Aug. 24, 1993 [DE] Germany .......................... 43 28 412.4

[51] Int. Cl.[6] .................................................. C04B 35/495

[52] U.S. Cl. .......................... 106/479; 106/419; 106/461; 106/462

[58] Field of Search .................................... 106/479, 419, 106/461, 462

[56] References Cited

U.S. PATENT DOCUMENTS

| | | | |
|---|---|---|---|
| 4,026,722 | 5/1977 | Hess | 106/479 |
| 4,115,141 | 9/1978 | Piltingerud | 106/479 |
| 4,251,283 | 2/1981 | Balducei et al. | 106/427 |
| 4,455,174 | 6/1984 | Wienand et al. | 106/479 |
| 5,123,965 | 6/1992 | Herren et al. | 106/462 |
| 5,273,577 | 12/1993 | Liedek et al. | 106/479 |

FOREIGN PATENT DOCUMENTS

| | | |
|---|---|---|
| 2076371 | 6/1992 | Canada . |
| WO92/11205 | 7/1992 | WIPO . |
| WO94/01497 | 1/1994 | WIPO . |

*Primary Examiner*—Mark L. Bell
*Assistant Examiner*—Scott L. Hertzog
*Attorney, Agent, or Firm*—Oblon, Spivak, McClelland, Maier & Neustadt

[57] ABSTRACT

Bismuth vanadate pigments have $$Bi_xE_vSi_yV_{(1-z)}P_zO_w$$

where x is from 0.8 to 1.2, y is from 0 to 4, z is from 0 to 0.2, v is from >0 to 0.5, and w is the number of oxygen atoms for satisfying the valence requirements of the cations, with the following provisos:

a) when y=0, then z is from >0 to <0.05 and E is calcium or a mixture of calcium and zinc and/or magnesium in which the molar ratio of calcium to zinc and/or magnesium is ≧1, b) when 0<y<1, then z is from 0 to 0.2 and E is calcium or a mixture of calcium and zinc and/or magnesium in which the molar ratio of calcium to zinc and/or magnesium is ≧1, c) when y≧1, then z is from 0 to 0.2 and E is zinc, magnesium, calcium,, lithium, aluminum or mixtures thereof.

15 Claims, No Drawings

BISMUTH VANADATE PIGMENTS

The present invention relates to novel bismuth vanadate pigments of the general formula I $$Bi_xE_vSi_yV_{(1-z)}P_zO_w \qquad I$$

where x is from 0.8 to 1.2, y is from 0 to 4, z is from 0 to 0.2, v is from >0 to 0.5, and w is the number of oxygen atoms for satisfying the valence requirements of the cations, with the following provisos:

a) when y=0, then z is from >0 to <0.05 and E is calcium or a mixture of calcium and zinc and/or magnesium in which the molar ratio of calcium to zinc and/or magnesium is ≧1, b) when 0<y<1, then z is from 0 to 0.2 and E is calcium or a mixture of calcium and zinc and/or magnesium in which the molar ratio of calcium to zinc and/or magnesium is ≧1, c) when y≧1, then z is from 0 to 0.2 and E is zinc, magnesium, calcium, lithium, aluminum or mixtures thereof.

The invention further relates to the preparation of these pigments and to their use for coloring paints, printing inks and plastics, Bismuth vanadate is a useful non-toxic yellow pigment especially for coloring paints and plastics. To improve the application properties, in particular the thermal stability and the resistance to chemicals, the pigments generally contain dopants such as alkaline earth metal, zinc, aluminum, phosphate and silicate ions (DE-A-27 27 865, DE-A-29 40 185, DE-A-42 00 925, EP-A-441 101 and WO-A-92/11205) or they are subsequently provided with protective sheaths formed from silicates, phosphates or metal oxides (DE-A-27 27 864, DE-A-31 35 281 and DE-A-40 37 878).

However, the known pigments do not fully satisfy the tinctorial and application requirements.

It is an object of the present invention to provide bismuth vanadate pigments which have good properties and are advantageous for the uses mentioned.

We have found that this object is achieved by the bismuth vanadate pigments defined at the beginning.

We have also found a process for preparing these pigments by mixing of bismuth- and vanadium-containing solutions and subsequent heat treatment of the resulting precipitate, which comprises admixing a stirred alkaline vanadate solution with an acidic bismuth salt solution in the presence of soluble salts of the metals calcium, zinc, magnesium, lithium and/or aluminum and optionally a soluble phosphate and/or silicate, adjusting the mixture with a base to a pH from 3 to 6.5, keeping the pH constant during the heating at up to 100° C. by continued addition of base as long as the pH keeps on dropping, then stirring the mixture at that temperature until the pH remains constant on its own, and subsequently isolating the precipitated pigment, washing the isolated pigment salt-free, drying the salt-free pigment and heat-treating the dried pigment at from 300° to 700° C. for from 0.5 to 5 hours.

We have also found that these pigments are useful for coloring paints, printing inks and plastics.

The bismuth vanadate pigments of the invention have the composition $$Bi_xE_vSi_yV_{(1-z)}P_zO_w \qquad I$$

where the variables have the following meanings:

x is from 0.8 to 1.2, preferably from 0.9 to 1.1, y is from 0 to 4, preferably from 0 to 2, z is from 0 to 0.2, preferably from 0 to 0.1, v is from >0 to 0.5, preferably from 0.01 to 0.1, and w is the number of oxygen atoms for satisfying the valence requirements of the cations.

But the following provisos apply:

a) When y=0, ie. in the case of compositions $Bi_xE_vV_{(1-z)}P_zO_w$, then z is from >0 to <0.05, preferably from 0.002 to 0.03. In this case E is calcium or a mixture of calcium and zinc and/or magnesium in which the molar ratio of calcium to zinc and/or magnesium is ≧1.

b) When 0<y<1, then z is from 0 to 0.2, preferably from 0 to 0.1. E has the same meaning as in case a).

c) When y≧1, then z is from 0 to 0.2, preferably from 0.01 to 0.1. E is zinc, magnesium, calcium, lithium, aluminum or mixtures thereof, preferably zinc.

Depending on the manner of preparation, the composition of the pigment particles can differ between inside and outside. The stated formula should therefore be considered the average composition for the pigment as a whole.

The bismuth vanadate pigments I of the invention have excellent properties. They have a chroma (C*) of ≧90, a lightness (L*) of ≧82 and a hue° from 89 to 95. They exhibit photochromism with a ΔE value of ≦1 (CIELAB) and thermal stability with a ΔE of ≦3 (CIELAB), attention having to be drawn in particular to the sili-con-containing pigments I (y>0, in particular y>1).

The CIELAB terms chroma, lightness and hue° are well known from the literature; see for example Hans G. Völz, Weinheim (1990) and R. W. G. Hunt, Measuring Colour, Ellis Horwood Limited, West Sussex (1987).

Photochromism is the reversible transformation of one compound into another of different color (absorption spectrum) due to visible or ultraviolet light (see Römpps Chemie-Lexikon, 9th Edition, Volume 4 (1985)). The ΔE value represents the total color difference.

Thermal stability is analogously the ability of a substance to resist change under the action of heat on incorporation into plastics (eg. polyethylene and related polymers—measurement at 180° C. and 260° C.). The ΔE value again represents the total color difference.

The bismuth vanadate pigments I can advantageously be prepared by the two-stage process of the invention by initially precipitating the pigment at a suitable pH in the presence of the desired dopants by mixing appropriate precursor solutions and then subjecting it to a heat treatment.

In detail the procedure can be as follows. An alkaline vanadate solution with or without added soluble phosphate is admixed with an acidic bismuth salt solution containing the desired dopants as soluble salts. The pH of the mixture is then adjusted with a base to a value of from generally 3 to 6.5 and kept constant (generally at from 4.5 to 5.5) with the continued addition of base during the heating at up to 100° C. as long as the pH keeps on dropping. Then the mixture is stirred at that temperature until the pH, which starts to rise, remains constant on its own. This generally takes from 0.5 to 5 h.

However, the dissolved dopants can also be added to the reaction mixture in stages. This procedure is particularly advantageous for doping with silicon. In this case it is particularly adwntageous to admix the reaction mixture with further silicate solution after the pH has stabilized to a value from 7.5 to 10.

The precipitation reaction is advantageously carried out using for example the following starting compounds:

- ammonium and alkali metal, in particular potassium and sodium, vanadate;
- alkali metal phosphates and hydrogen phosphates, in particular potassium and sodium phosphate, and also phosphoric acid;
- bismuth nitrate;
- calcium, magnesium, zinc, lithium and aluminum nitrate, chloride and sulfate;
- waterglass and also hexafluorosilicic acid and salts thereof such as zinc hexafluorosilicate;
- as bases in particular alkali metal hydroxides such as potassium and especially sodium hydroxide.

Usually theprecipitated pigment is then filtered off, washed salt-free and dried.

The dried pigment is then additionally heat-treated at from 300° to 700° C., preferably at from 400° to 500° C. This heat treatment generally takes from 0.5 to 5 h.

If desired, the thermal stability and the chemical resistance of the bismuth vanadate pigments of the invention can be further improved by additionally subjecting them to one of the abovementioned stabilizing treatments (eg. coating with silicates, phosphates or metal oxides). Generally, the silicon-containing bismuth vanadate pigments of the invention, in particular, have sufficient thermal stability even without a subsequent coating.

The pigments of the invention are advantageously suitable for coloring paints, printing inks and plastics.

EXAMPLES

Preparation and assessment of bismuth vanadate pigments according to the invention.

The tinctorial properties and the photochromism were assessed on coatings prepared as follows. A mixture of 20 g of the particular pigment and 80 g of an alkyd-melamine baking varnish (45% by weight solids content) was shaken on a Skandex machine for 60 min with 150 g of glass balls (3 mm diameter), then sprayed hidingly onto aluminum Q-panels and baked at 130° C. for 30 min.

To determine the CIELAB values hue°, chroma $C^*$ and lightness $L^*$, the coatings obtained were measured with a Zeiss RFC 16 spectrophoto-meter.

To assess the photochromism, the coatings were each half-covered with a metal stencil and then irradiated for 3 h using a 1000 watt floodlight (Sylvania, 1000 W halogen lamp, code No. 216259; distance 45 cm). The $\Delta E$ values were determined by directly subsequent, comparative measurement of the irradiated and nonirradiated parts of the coatings using the abovementioned spectrophoto-meter (difference between the averages from three meas-urements each).

To assess the thermal stability of the pigments, a mixture of 99% by weight of HD polyethylene Lupolen® 6031M (BASF) and 1% by weight of the respective pigment was extruded at a temperature of a) 180° C. and b) 260° C. and injected into a mold (60 mm in length, 45 mm in width, 2 mm in height) in such a way as to produce a uniform surface. The specimens produced at 180° C. and 260° C. were then measured with the abovementioned spectrophoto-meter to determine the cleanness of the hue and the entire tinctorial properties (determination of $\Delta C^*$ and $\Delta E$). The smaller the $\Delta C^*$ and $\Delta E$ values, the smaller the difference between the specimens produced at the two temperatures and hence the better the thermal stability of the pigment.

EXAMPLES 1 TO 7

To a mixture of 209.1 ml of aqueous sodium vanadate solution containing 79.92 g of vanadium/l (16.7 g of vanadium), 500 ml of water and a g of 85% strength by weight phosphoric acid were added with stirring, over 40 min, 621.7 g of bismuth nitrate solution containing 11.05% by weight of bismuth (68.7 g of bismuth) and 6% by weight of nitric acid, in which b g of calcium nitrate ($Ca(NO_3)_2 \cdot 4H_2O$), c g of zinc nitrate ($Zn(NO_3)_2 \cdot 6H_2O$) and d g of sodium silicate (28% by weight of $SiO_2$) which had been diluted with water in a ratio of 1:10 had been dissolved.

The pH of the mixture was then adjusted with 30% strength by weight of sodium hydroxide solution to 4.5 over 1 h and then with 5% strength by weight sodium hydroxide solution to 5 over 10 min.

Thereafter the resulting, light-brown suspension was heated to 95° C. while pH 5 was maintained by continued addition of sodium hydroxide solution. After about 1 h the suspension turned yellow and the pH rose to 7.6. The suspension was then stirred at 95° C. until the pH remained constant.

The pigment was filtered off, washed salt-free, dried at 110° C. and subsequently additionally heat-treated at 400° C. for 30 min.

Details of these experiments and the results of the tinctorial measurements are shown in Table 1.

TABLE 1

| Ex. | a g of $H_3PO_4$ | b g of $Ca(NO_3)_2 \cdot 4H_2O$ | c g of $Zn(NO_3)_2$ | d g of waterglass | Tinctorial data Hue° | C* | L* | Photochromism $\Delta E$ |
|---|---|---|---|---|---|---|---|---|
| 1 | 0.76 | 0.77 | — | — | 92.3 | 96.1 | 84.5 | 0.9 |
| 2 | 0.76 | 3.87 | — | — | 92.3 | 95.0 | 84.7 | 0.6 |
| 3 | 0.76 | 7.74 | — | — | 92.6 | 95.8 | 85.8 | 0.5 |
| 4 | 0.76 | 1.94 | 2.44 | — | 92.0 | 98.8 | 85.7 | 0.8 |
| 5 | 2.30 | 1.94 | — | 3.5 | 91.3 | 98.8 | 84.2 | 0.8 |
| 6 | 2.30 | 1.94 | — | 7.0 | 89.4 | 99.9 | 83.8 | 0.8 |
| 7 | 0.62 | 1.94 | — | 3.5 | 90.8 | 99.7 | 83.8 | 0.7 |

EXAMPLES 8 AND 9

To a mixture of 261.3 g of a sodium vanadate solution containing 7.08% by weight of vanadium (18.5 g of vanadium; density 1.183 g/l; pH 9.4), 300 ml of water and 2.5 g of 85% strength by weight phosphoric acid was added with stirring, over 60 min, a mixture of 309 g of bismuth nitrate solution containing 24.26% by weight of bismuth (75 g of bismuth; density 1,661 g/l), 600 ml of water, a g of 53% strength by weight nitric acid and b g of sodium silicate (28% by weight of $SiO_2$).

The pH of the mixture was adjusted to 5.6 with c g of 25% strength by weight sodium hydroxide solution. Then the resulting, light-brown suspension was heated to 95° C. while this pH was maintained by addition of 5% strength by weight sodium hydroxide solution. After about 1 h the suspension turned yellow. After the pH had been stabilized at 8.0±0.3, $d_1$ g of zinc hexafluorosilicate (ZHFS; $Zn(SiF_6).6H_2O$), dissolved in $e_1$ g of water, were added, while the pH was maintained at 7.5 by addition of f g of 25% strength by weight sodium hydroxide solution.

The suspension was washed to a conductivity <1000 µS, brought to a volume of 1300 ml and heated to 85° C. Then a solution of 75 g of sodium silicate (28% by weight of $SiO_2$) and 600 ml of water was added over 3 h while the pH was maintained at 8.5 with 13 ml of 53% strength by weight nitric acid in 130 ml of water. Then $d_2$ g of zinc hexafluorosilicate, dissolved in $e_2$ g of water, were added while the pH was again kept at 8 by addition of f g of 25% strength by weight sodium hydroxide solution.

The pigment was filtered off, washed salt-free, dried and then heat-treated at 45° C. for 1 h.

Details of these experiments and the results of the tinctorial measurements are listed in Table 2.

TABLE 2

| | a g of | b g of water | c g of | $d_1$ g of | $e_1$ g of | f g of | $d_2$ g of | $e_2$ g of | Tinctorial data | | | Photochromism | Thermal stability | |
|---|---|---|---|---|---|---|---|---|---|---|---|---|---|---|
| Ex. | $H_3PO_4$ | glass | NaOH | ZHFS | $H_2O$ | NaOH | ZHFS | $H_2O$ | Hue° | C* | L* | ΔE | ΔC* | ΔE |
| 8 | 16.5 | 23.3 | 196 | 3.3 | 50 | 9.2 | 4.9 | 60 | 95.1 | 90.4 | 83.3 | 0.5 | 2.2 | 2.8 |
| 9 | 33.0 | 46.6 | 215 | 6.6 | 100 | 18.4 | 9.8 | 120 | 94.3 | 92.1 | 82.8 | 0.5 | 1.8 | 1.9 |

We claim:

1. A bismuth vanadate pigment of the formula I $$Bi_xE_vV_{(1-z)}P_zO_w \quad \text{I}$$

where x is from 0.8 to 1.2, z is from >0 to <0.05, v is from >0 to 0.5, and w is the number of oxygen atoms for satisfying the valence requirements of the cations, and E is calcium or a mixture of calcium and zinc and/or magnesium in which the molar ratio of calcium to zinc and/or magnesium is ≧1 obtained by precipitation from a solution of alkaline vanadate, soluble phosphate, acidic bismuth salt and dopants.

2. The bismuth vanadate pigment of claim 1, wherein x is from 0.9 to 1.1, z is from 0.002 to 0.05, and v is from 0.01 to 0.1.

3. A bismuth vanadate pigment of the formula I $$Bi_xE_vSi_yV_{(1-z)}P_zO_w \quad \text{I}$$

where x is from 0.8 to 1.2, y is from >0 to <1, z is from 0 to 0.2, v is from >0 to 0.5, w is the number of oxygen atoms for satisfying the valence requirements of the cations, and E is calcium or a mixture of calcium and zinc and/or magnesium in which the molar ratio of calcium to zinc and/or magnesium is ≧1.

4. The bismuth vanadate pigment of claim 3, wherein x is from 0.9 to 1.1, z is from 0 to 0.1, and v is from 0.01 to 0.1.

5. A bismuth vanadate pigment of the formula I $$Bi_xE_vSi_yV_{(1-z)}P_zO_w \quad \text{I}$$

where x is from 0.8 to 1.2, y is from ≧1 to 4, z is from 0 to 0.2, v is from >0 to 0.5, w is the number of oxygen atoms for satisfying the valence requirements of the cations, and E is zinc, magnesium, calcium, lithium or a mixture thereof.

6. The bismuth vanadate pigment of claim 5, wherein x is from 0.9 to 1.1, y is from ≧1 to 2, z is from 0.01 to 0.1, z is from 0.01 to 0.1, and E is zinc.

7. The bismuth vanadate pigment of claim 5 obtained by precipitation from a solution of alkaline vanadate, soluble phosphate, acidic bismuth salt and dopants.

8. A method of coloring comprising adding a bismuth vanadate pigment of formula I $$Bi_xE_vV_{(1-z)}P_zO_w \quad \text{I}$$

where x is from 0.8 to 1.2, z is from >0 to <0.05, v is from >0 to 0.5, and w is the number of oxygen atoms for satisfying the valence requirements of the cations, and E is calcium or a mixture of calcium and zinc and/or magnesium in which the molar ratio of calcium to zinc and/or magnesium is ≧1 obtained by precipitation from a solution of alkaline vanadate, soluble phosphate, acidic bismuth salt and dopants, to a composition selected from the group consisting of a paint, a printing ink and a plastic.

9. A method of coloring comprising adding a bismuth vanadate pigment of formula I $$Bi_xE_vSi_yV_{(1-z)}P_zO_w \quad \text{I}$$

where x is from 0.8 to 1.2, y is from >0 to <1, z is from 0 to 0.2, v is from >0 to 0.5, w is the number of oxygen atoms for satisfying the valence requirements of the cations, and E is calcium or a mixture of calcium and zinc and/or magnesium in which the molar ratio of calcium to zinc and/or magnesium is ≧1 to a composition selected from the group consisting of a paint, a printing ink and a plastic.

10. A method of coloring comprising adding a bismuth vanadate pigment of formula I $$Bi_xE_vSi_yV_{(1-z)}P_zO_w \quad \text{I}$$

where x is from 0.8 to 1.2, y is from ≧1 to 4, z is from 0 to 0.2, v is from >0 to 0.5, w is the number of oxygen atoms for satisfying the valence requirements of the cations, and E is zinc, magnesium, calcium, lithium or a mixture thereof to a composition selected from the group consisting of a paint, a printing ink and a plastic.

11. The bismuth vanadate pigment of claim 1, having a chroma (C*) of ≧90, a lightness (L*) of ≧82, a hue° of from 89 to 95, a photochromism ΔE value ≦1 (CIELAB) and a thermal stability with a ΔE value of ≦3 (CIELAB).

12. The bismuth vanadate pigment of claim 3, having a chroma (C*) of ≧90, a lightness (L*) of ≧82, a hue° of from 89 to 95, a photochromism ΔE value ≦1 (CIELAB) and a thermal stability with a ΔE value of ≦3 (CIELAB).

13. The bismuth vanadate pigment of claim 5, having a chroma (C*) of ≧90, a lightness (L*) of ≧82, a hue° of from 89 to 95, a photochromism ΔE value ≦1 (CIELAB) and a thermal stability with a ΔE value of ≦3 (CIELAB).

14. A process for preparing a bismuth vanadate pigment of the formula I, $$Bi_xE_vSi_yV_{(1-z)}P_zO_w \quad \text{I}$$

where x is from 0.8 to 1.2, y is from 0 to 4, z is from 0 to 0.2, v is from >0 to 0.5, w is the number of oxygen atoms for satisfying the valence requirements of the cations, with the following provisos:

a) when y=0, then z is from >0 to <0.05, and

E is calcium or a mixture of calcium and zinc and/or magnesium in which the molar ratio of calcium to zinc and/or magnesium is ≧1, b) when 0 <y<1, then z is from 0 to 0.2, and E is calcium or a mixture of calcium and zinc and/or magnesium in which the molar ratio of calcium to zinc and/or magnesium is ≧1, and c) when y≧1, then z is from 0 to 0.2, E is zinc, magnesium, calcium, lithium, aluminum or a mixture thereof by mixing of bismuth- and vanadium-containing solutions and subsequent heat treatment of the resulting precipitate, which comprises admixing a stirred alkaline vanadate solution with an acidic bismuth salt solution in the presence of soluble salts of the metals calcium, zinc, magnesium, lithium and/or aluminum and optionally a soluble phosphate and/or silicate, adjusting the mixture with a base to a pH from 3 to 6.5, keeping the pH constant during the heating at up to 100° C. by continued addition of base as long as the pH keeps on dropping, then stirring the mixture at that temperature until the pH remains constant on its own, and subsequently isolating salt-free pigment, drying the salt-free pigment and heat-treating treating the dried pigment at from 300° to 700° for from 0.5 to 5 hours.

15. A process as claimed in claim 14, wherein the soluble silicate is added to the reaction mixture in stages.

* * * * *